Sept. 1, 1942. T. W. PAUL Re. 22,171

MOWER

Original Filed May 13, 1933 2 Sheets-Sheet 1

INVENTOR.

Talbert W. Paul,

BY

Bowen, Jackson, Boettcher & Denner.

ATTORNEYS.

Sept. 1, 1942. T. W. PAUL Re. 22,171

MOWER

Original Filed May 13, 1933 2 Sheets-Sheet 2

INVENTOR.

Talbert W. Paul,

BY

Brown, Jackson, Boettcher & Dienner.

ATTORNEYS.

Reissued Sept. 1, 1942

Re. 22,171

UNITED STATES PATENT OFFICE 22,171

MOWER

Talbert W. Paul, Moline, Ill., assignor to Deere & Company, Moline, Ill., a corporation of Illinois Original No. 1,946,544, dated February 13, 1934, Serial No. 670,864, May 13, 1933. Application for reissue June 8, 1942, Serial No. 446,257

12 Claims. (Cl. 56—25)

Figure 1:
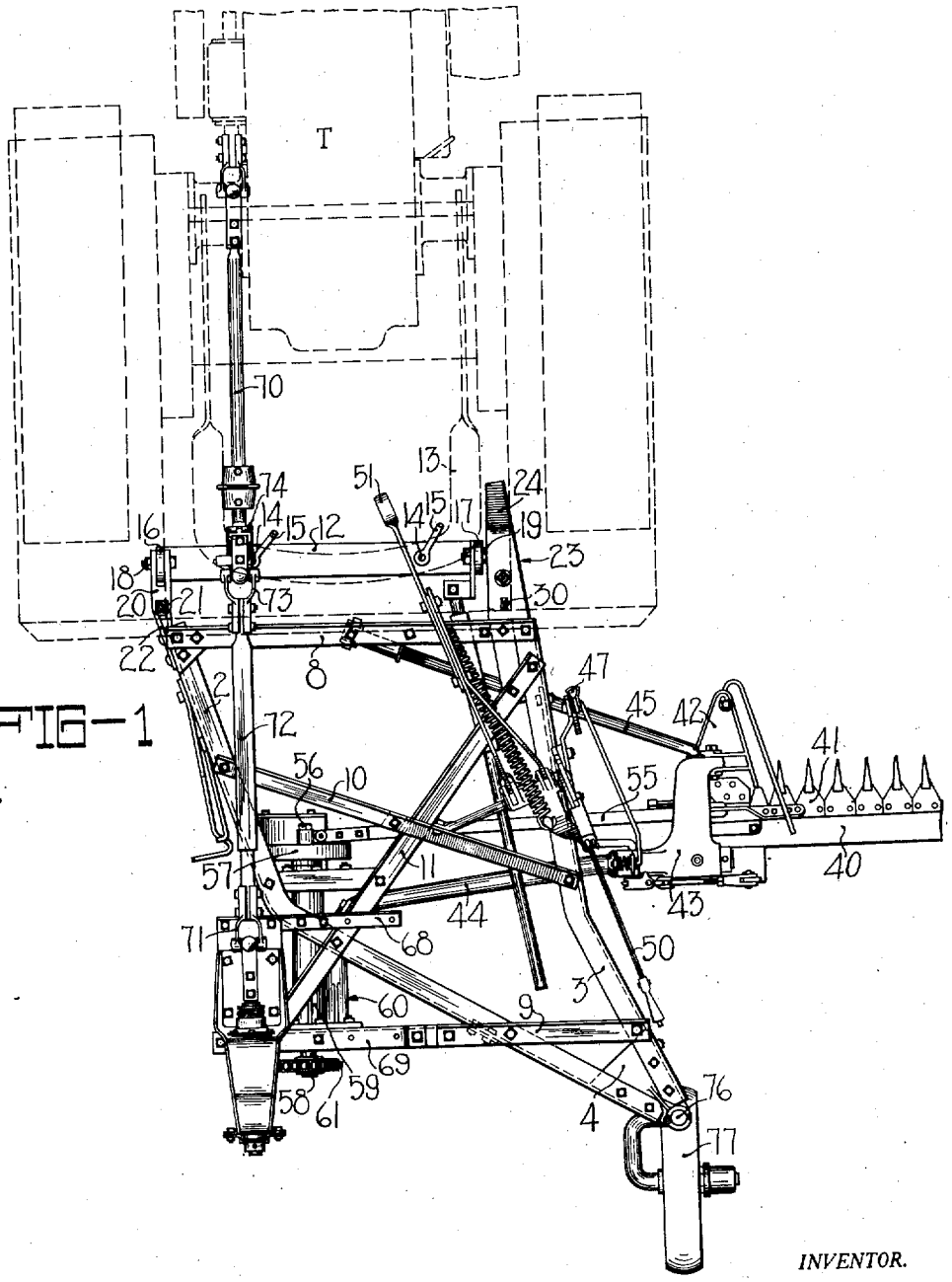
Figure 3:
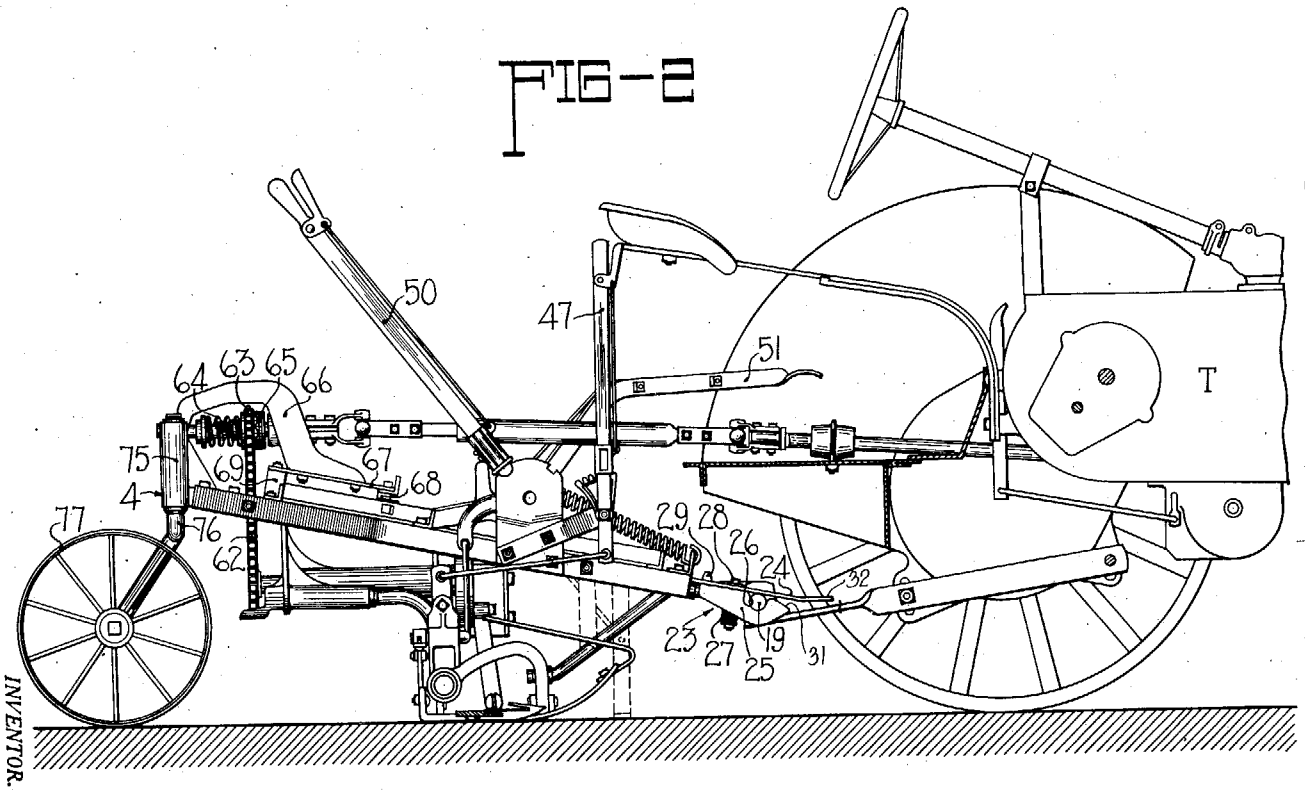

This invention relates to mowers, and more particularly to mowers of the type which are adapted to be connected to a tractor to be drawn thereby and in which the operating mechanisms of the mower are operated by power derived from the power take-off of the tractor. A mower of this general type is disclosed in my pending application, Serial No. 403,942, filed November 1, 1929, and, broadly speaking, the present invention has to do with improved means for supporting the mower frame.

More specifically, the principal object of the present invention is to provide improved and simplified means for connecting the forward end of the mower frame to the tractor whereby the mower may swing vertically with respect to the tractor and may also swing horizontally about a vertical pivot when the cutting mechanism of the mower strikes an obstruction.

Another object of the invention is to provide means for supporting the rear of the mower frame at the side adjacent the cutting mechanism directly on the ground whereby the mower will follow the contour of the ground independently of the tractor.

These and other objects and advantages of the present invention will be apparent from the following detailed description of an illustrative embodiment, taken in conjunction with the accompanying drawings illustrating such embodiment.

In the drawings:

Figure 1 is a top plan view of the mower as applied to a tractor, shown fragmentarily in dotted lines, and illustrating my improved means for connecting the mower to the tractor and for supporting the rear end of the mower; and Figure 2 is a side elevation, viewed from the cutter bar side, of the parts shown in Figure 1.

Referring now more particularly to the several figures of the drawings, the mower frame comprises a pair of members 2 and 3 in the form of angle bars which are suitably spaced apart at their forward ends and converge rearwardly, their rear ends being bolted to a casting 4. At their forward ends the frame members 2 and 3 are connected together by a transverse angle bar member 8, while at their rear ends they are connected together by a transverse angle bar member 9. Also, a pair of diagonal braces in the form of angle bars 10 and 11 connect said members 2 and 3 together whereby a rigid mower frame is provided.

The forward end of the mower frame is supported, as hereinafter described, on a transversely extending member 12. The transverse supporting member 12 provides means for connecting the mower to the tractor and, as shown, it is rigidly connected to the U-shaped draw bar 13 of the tractor T by means of a pair of bolts 14 extending through aligned holes in the member 12 and bar 13 and provided with wing nuts 15 whereby the transverse member 12 can be quickly and easily connected to and disconnected from the tractor, as will be readily understood. The transversely extending member 12 is provided with upwardly turned ends 16 and 17 extending at right angles to the main body portion thereof as shown in Figure 1, and said members are perforated to receive, respectively, a pivot bolt 18 and a pivot pin 19, which bolt and pin extend transversely of the implement in a horizontal plane in axial alignment with each other. As shown in Figure 1, the forward end of a forked member 20 is pivotally connected to the bolt 18, while at its rear end the member 20 carries a vertically disposed pivot bolt 21. Fixedly secured in any suitable manner to the forward end of the frame member 2 at the left hand front corner of the mower is a bracket 22 in the form of a strap extending forwardly from said frame member and looped around the vertical pivot bolt 21. It will be seen from the foregoing that the horizontal pivot bolt 18, the member 20, the vertical pivot bolt 21 and the strap 22 provide, in effect, a universal joint connection between the mower frame and the supporting member 12, as the frame may swing both vertically and horizontally relatively to the supporting member.

At its opposite side the frame of the mower is pivotally connected to the horizontal pivot pin 19 through the instrumentality of a latch mechanism 23. This latch mechanism 23 comprises a spring plate 24 fixedly connected at its rear end to the right hand front corner of the mower frame by any suitable means and extending forwardly therefrom. The spring plate 24 carries a latch member 25 which is in the form of a suitable casting having a semi-circular recess 26 in its top surface, as shown in Figure 2, to receive the pivot pin 19. The latch member 25 is yieldingly supported below the spring plate 24 by means of a spring 27 embracing a bolt 28 which is carried by the plate 24 and extends vertically through a suitable opening in the latch member 25, the upper end of the spring bearing against the lower face of the member 25 and the lower end of the spring bearing against a stop member carried by the bolt. The latch member 25 is provided with a vertically extending lug 29 at its rear end which projects upwardly through a slot 30 formed in the plate 24 and, together with the bolt 28, maintains the member 25 of the latch in proper position relative to the spring plate 24. The forward end of the latch member 25 is provided with a cam surface 31 to facilitate engagement of the pin 19 in the recess 26, as will be readily understood. The forward end portion 32 of the spring 24 is also bent upwardly to facilitate this operation.

The pivot pin 19 being in alignment with the pivot bolt 18, these two members define the horizontal transverse axis about which the mower swings in its rising and falling movements with respect to the tractor when in operation.

Should the cutter bar of the mower strike an obstruction when in operation whereby said cutter bar is prevented from moving forward with the tractor, the pivot pin 19 causes a separation of the forward end of the latch member 25 and the spring plate 24, the forward end of the spring plate 24 being flexed upwardly while the member 25 is forced downwardly against the action of the spring 27, thereby disengaging the latch from the pivot pin 19, whereupon the mower will swing rearwardly about the vertical pivot bolt 21, as will be readily understood.

The cutter bar, indicated at 40, supports a reciprocating sickle 41. The cutter bar itself is supported on a shoe 42 pivotally connected in any suitable manner to a shoe arch 43 connected with the mower frame by a drag bar 44 and a rod or brace 45. The shoe arch 43 is journaled for rocking movement about a transverse axis on the drag bar 44 and such rocking movement is controlled by a tilting lever 47. The cutter bar 40 is lifted relatively to the frame of the mower through the agency of a lifting lever 50. The cutting mechanism may also be lifted to some extent by means of a foot lever 51.

The sickle 41 is suitably supported in any appropriate manner for reciprocatory movement and is operated by a pitman 55 connected at one end in any appropriate manner to the sickle and connected at its opposite end to a crank pin 56 of a fly-wheel 57 mounted on the forward end of a shaft 58 suitably journaled in bearings provided in a sleeve 59 in a casting 60 supported by the frame. A sprocket wheel 61 is fixed to the rear end of the shaft 58 and is connected by means of a drive chain 62 with a sprocket wheel 63 mounted on a drive shaft 64 and driven thereby through a slip clutch 65. The drive shaft 64 is suitably journaled in bearings provided in a casting 66 mounted on a plate 67 supported from the mower frame on brackets 68 and 69.

The drive shaft 64 is driven from the power take-off shaft 70 on the tractor through suitable connection therewith including a universal joint 71, telescoping connection 72, universal joint 73 and a disconnect clutch 74.

As my present invention is not particularly concerned with the construction of the mower frame per se or with the cutting mechanism of the mower and the means for supporting the same on the mower frame, or with the means for driving the cutting mechanism from the power take-off of the tractor, it is believed that the above brief description thereof will suffice. These several parts are fully described in the application of Wilbur J. Coultas and Nolan D. Colvin, Serial No. 669,141, filed May 10, 1933, to which reference may be had if deemed desirable.

As mentioned above, the present invention is concerned with the provision of new and improved supporting means for the mower and which embodies the feature of pivotally connecting the forward end of the mower frame on the tractor and supporting the rear portion of the mower frame directly on the ground. As will be apparent, this provides a construction in which the cutting mechanism follows closely the ground contour since, in the first place, the rear tractor wheels are closely adjacent the forward end of the mower frame, and, in the second place, the rear ground engaging supporting means for the mower frame causes the mower unit to closely follow irregularities in the terrain. Another advantage of the present construction is that, since the mower unit is pivotally connected with the tractor for free vertical swinging, the mower unit can follow irregularities in the ground surface independently of the movements of the tractor itself in this respect.

The forward end of the mower frame is pivotally connected with the supporting bar 12 carried on the tractor by the pivots 18 and 19 described above. As best shown in Figure 2, the casting 4, which is secured to the rearwardly converging ends of the frame bars 2 and 3, is provided with a vertically extending sleeve portion 75 which is preferably formed integral therewith and is adapted to receive the vertical spindle 76 of a caster wheel 77. As best shown in Figure 1, the rear ends of the frame bars 2 and 3 are formed to dispose the caster wheel 77 to the right of the main portion of the mower frame and almost directly behind the cutter bar shoe 42. This disposes the rear ground engaging supporting means, namely, the caster wheel 77, in a position where it will support most of the weight of the mower unit. Particularly is this true when the sickle bar has been raised to inoperative or transport position. It is also to be noted that the frame members 3 and 4 extend rearwardly a sufficient distance so that when the frame swings about the pivot 21 and the caster wheel swings relative to the frame about its pivot 76 the cutter bar 40 will not strike the caster wheel 77.

Mention was made above of the releasable characteristic of the mower unit whereby, should the cutter bar strike an obstruction, the cutter bar is automatically released from its supporting frame and is permitted to swing rearwardly if the tractor continues its forward advance. Also, this rearward swinging movement of the cutter bar automatically releases the driving connections between the tractor and the sickle bar. In this connection, the provision of a caster wheel for supporting the rear portion of the mower frame is of particular importance. Referring to Figure 1, it will be observed that whenever the cutter bar 40 strikes an obstruction and the latch 23 is released the entire mower frame swings about a vertical axis defined by the pivot 21, the wheel 77, by virtue of being a caster wheel, readily providing for this movement while still effectively supporting the rear portion of the mower frame. Thus, the provision of a rear supporting caster wheel for the mower frame is of importance where the mower frame, or at least the portion supported by the caster wheel, is adapted to swing laterally when obstructions are encountered. It is to be noted, moreover, that the caster wheel 77 of the present invention is employed in a mower unit wherein the mower frame is pivotally connected with a tractor for both vertical swinging about a horizontal axis and horizontal swinging about a vertical axis.

While I have described above the principal features of my invention, it will be apparent to those skilled in the art that my invention is not to be limited to the specific means shown and described but that, in fact, widely different means may be employed in the practice of the broader aspects of my invention.

What I claim, therefore, and desire to secure by Letters Patent is:

1. The combination with a tractor, of a mower comprising a frame and cutting mechanism carried thereby and extending laterally thereof from one side, said frame including a generally longitudinally extending frame bar extending laterally and rearwardly to a point substantially behind the traction wheel of the tractor at the side from which said cutting mechanism extends, and means disposed at the rear end of said frame bar for supporting the rear of the frame from the ground, whereby said mower will follow the contour of the ground independently of the tractor.

2. The combination with a tractor having rear traction wheels, of a mower comprising a frame and a cutting mechanism carried thereby and extending laterally thereof from one side, said cutting mechanism including a ground engaging shoe disposed adjacent the traction wheel at the side of the tractor from which said cutting mechanism extends, means for pivotally supporting the forward end of said frame on the tractor, whereby said frame may swing vertically with respect thereto, said frame including a generally rearwardly extending frame member having its rear end disposed laterally toward the side from which said cutting mechanism extends and to a point substantially in line with said one traction wheel and said shoe, and means supporting the rear of said frame from the ground, whereby said mower will follow the contour of the ground independently of the tractor.

3. The combination with a tractor, of a mower comprising a frame and a cutting mechanism carried by said frame and extending laterally therefrom, means for pivotally supporting the forward end of said frame on the tractor whereby said frame may swing vertically with respect to the tractor, said means including a vertical pivot about which said frame may swing in a horizontal plane, a releasable latch normally holding said frame in operative position, and means supporting the rear of said frame from the ground, whereby said mower will follow the contour of the ground independently of the tractor.

4. The combination with a tractor, of a mower comprising a frame and a cutting mechanism carried by said frame and extending laterally therefrom, means for pivotally supporting the forward end of said frame on the tractor whereby said frame may swing vertically with respect to the tractor, said means including a vertical pivot about which said frame may swing in a horizontal plane and a releasable latch normally holding said frame in operative position, and a caster wheel mounted to swing about a substantially vertical axis relative to said frame for supporting the rear of said frame, said caster wheel being disposed rearwardly of said cutting mechanism sufficiently so as not to strike the latter when swinging relative to said frame.

5. An agricultural machine adapted to be propelled by a tractor or the like, comprising, in combination, a supporting frame including longitudinally disposed frame bars connected together in rigid relation with respect to each other, means connecting the forward ends of said bars with the tractor at opposite sides thereof for vertical movement relative thereto about a transverse axis, said pivotal connection being established at two spaced points on the tractor whereby the frame is laterally rigid with respect thereto, operating means carried by said frame, caster wheel means supporting the rear portion of said frame, and connecting means associated with said first connecting means and providing for horizontal swinging movement of said frame about a vertical axis, said caster wheel means being so disposed relative to said vertical axis that said frame and operating means are substantially balanced about a line joining said axis and said wheel means.

6. An agricultural machine comprising, in combination, a tractor, an implement frame including a pair of longitudinally disposed frame bars connected together in rigid relation with respect to each other, means establishing a pivotal connection at their forward ends respectively with opposite sides of the tractor on a transverse axis whereby the frame is capable of vertical movement relative to the tractor and is prevented from moving laterally relative thereto, means disposed adjacent one side of the tractor and cooperating with said first means for establishing a vertical pivot for the frame to provide for swinging movement thereof in a horizontal plane, and caster wheel means at the rear ends of said frame bars for supporting the rear of said implement frame, said caster wheel means being so arranged laterally of said frame bars and relative to said vertical pivot means that said frame is substantially balanced about a line joining said vertical pivot means and the point of contact of said caster wheel means with the ground.

7. An agricultural machine adapted to be propelled by a tractor or the like, comprising, in combination, a supporting frame including horizontal longitudinally disposed frame bars rigidly connected together and pivotally connected at their forward ends, respectively, directly with laterally spaced points on the tractor for vertical movement relative thereto about a transverse axis, said pivotal connection being established at two laterally spaced points on the tractor whereby the frame is laterally rigid with respect thereto, means associated with said frame bars and serving to establish a vertical pivot for said supporting frame to provide for swinging movement thereof in a horizontal plane, said vertical pivot being disposed at one side of the frame, ground engaging means supporting the other ends of said bars, said ground engaging means being disposed adjacent the rear of said frame bars and at the side opposite said vertical pivot, operating means carried by said frame, and means for driving said operating means from the power of the tractor including two universal joints and a telescopic connection therebetween and disposed adjacent said vertical pivot.

8. The combination with a tractor, of a mower adapted to be propelled thereby comprising a rigid frame supported at its forward end on the tractor and pivotally connected to the tractor at two laterally spaced points, whereby the frame is held laterally rigid with respect to the tractor but is free to rise and fall relative thereto, caster wheel means supporting the rear end of the frame, a cutting mechanism including a sickle extending laterally to one side of the frame, a driving mechanism including a crank shaft mounted on the frame on the side opposite the cutting mechanism, a pitman connecting the crank shaft and the sickle, and a power connection between the driving mechanism and the power take-off shaft of the tractor including a pair of universal joints and the telescopic connection to accommodate the rising and falling movements of the mower frame with respect to the tractor.

9. The combination with a tractor, of a mower comprising a frame and cutting mechanism carried thereby and extending laterally thereof from one side, said frame including a generally longitudinally extending frame bar extending laterally and rearwardly to a point substantially behind the tractor wheel of the tractor at the side from which said cutting mechanism extends, means connecting said mower frame to the tractor at laterally spaced points providing for vertical swinging movement of the mower frame relative to the tractor including a connection at the side opposite that to which said cutting mechanism extends providing for horizontal swinging movement of said mower frame out of operating position behind the tractor, a releasable latch for releasably holding said mower frame in operating position, and means including at least one caster wheel disposed at the rear end of said frame bar for supporting the rear of the frame from the ground, whereby said mower will follow the contour of the ground independently of the tractor.

10. The combination with a tractor, of a mower comprising a frame and cutting mechanism carried thereby and extending laterally thereof from one side, said frame including a generally longitudinally extending frame bar extending laterally and rearwardly to a point substantially behind the traction wheel of the tractor at the side from which said cutting mechanism extends, means connecting said mower frame to the tractor at laterally spaced points for vertical swinging movement relative to the tractor including a vertical pivot about which said mower frame may swing horizontally out of operating position behind the tractor, a releasable latch for releasably holding said mower frame in operating position, and means including at least one caster wheel disposed at the rear end of said frame bar for supporting the rear of the frame from the ground, whereby said mower will follow the contour of the ground independently of the tractor.

11. The combination with a tractor, of a mower comprising a frame and cutting mechanism carried thereby and extending laterally thereof from one side, said frame including a generally longitudinally extending frame bar extending laterally and rearwardly to a point substantially behind the traction wheel of the tractor at the side from which said cutting mechanism extends, means connecting said mower frame to the tractor at laterally spaced points including at one connecting point a longitudinally extending connecting link connected at one end to the tractor and at its other end to said mower frame providing for both vertical and horizontal swinging movement of said mower frame relative to the tractor, a latch mechanism for releasably restraining said mower frame from swinging horizontally, and means including at least one caster wheel disposed at the rear end of said frame bar for supporting the rear of the frame from the ground, whereby said mower will follow the contour of the ground independently of the tractor.

12. The combination with a tractor having rear traction wheels, of a mower comprising a frame and a cutting mechanism carried thereby and extending laterally thereof from one side, said cutting mechanism including a ground-engaging shoe disposed adjacent the traction wheel at the side of the tractor from which said cutting mechanism extends, means connecting said mower frame to the tractor at laterally spaced points including means for pivotally supporting the forward end of said frame on the tractor, whereby said frame may swing vertically with respect thereto, and a longitudinally extending link connected at one end to the tractor and at its other end to said mower frame and providing for both vertical and horizontal swinging movement of said mower frame with respect to the tractor, a releasable latch for releasably restraining said mower frame from horizontal swinging, said frame including a generally rearwardly extending frame member having its rear end disposed laterally toward the side from which said cutting mechanism extends and to a point substantially in line with said one traction wheel and said shoe, and means including at least one caster wheel at the rear end of said frame member for supporting the rear of said frame from the ground, whereby said mower will follow the contour of the ground independently of the tractor.

TALBERT W. PAUL.